July 24, 1962    W. HESSLENBERG    3,045,397
TREATING APPARATUS
Filed Dec. 2, 1959

INVENTOR:
WERNER HESSLENBERG

BY
Michael S. Striker
his ATTORNEY

3,045,397
TREATING APPARATUS
Werner Hesslenberg, Wuppertal-Elberfeld, Germany, assignor to Walther Technik Carl Kurt Walther, Wuppertal-Vohwinkel, Germany
Filed Dec. 2, 1959, Ser. No. 856,742
Claims priority, application Germany Dec. 5, 1958
16 Claims. (Cl. 51—7)

The present invention relates to treating apparatus.

More particularly, the present invention relates to apparatus for treating the surface of work pieces.

There exist treating apparatus for treating the surfaces of work pieces in which these work pieces together with a suitable treating agent are received in containers which are set into vibration, a suitable vibrator being provided for this purpose. The vibration causes the treating agent to move relative to the work pieces, and the work pieces themslves to move relative to each other. Due to the interaction between the work pieces and the treating agent in particular the surfaces of the work pieces are worked or treated so that a number of operations, such as the removal of burrs, the rounding of edges, polishing, or the like, may be carried out. Also, the treatment may be one in which the work pieces are coated. These various results can be obtained in known manner by selecting the appropriate solid or liquid treating agent or medium, or by using a suitable coating agent.

It is also known to mount a plurality of treating containers on a common carrier which is then vibrated so as to transmit the vibrations to the containers. The work pieces and treating agents then pass through the containers one after the other, so as to result in an installation in which a number of containers are mounted on a single vibrating carrier, the purpose of this being to obtain an arrangement in which the work pieces move through all containers at the same speed. In this way, the work pieces are caused to pass through each container without there being any special constant-speed transporting means such as conveyors, the movement of the work pieces through the containers being effected simply by the vibration. In order to subject the work pieces to different treatments in the various containers, the treating substances, solid or liquid, can be kept separate, or can be replaced as desired.

In known installations wherein a single vibrating carrier supports a plurality of containers through which the work pieces and treating agents pass successively, are generally used to treat work pieces of substantially the same size and shape. But there is on occasion need for an apparatus wherein the surfaces of work pieces of various sizes and shapes can be treated simultaneously, and to this end, there exist apparatus incorporating two drum-like containers which are arranged on a common vibrating carrier. In order to fill and empty these containers, the entire apparatus must be stopped so as to make it possible to open the drums, to insert or remove the work pieces, and then to close the drums. This procedure has been found to be necessary because the manual steps necessary to open, charge or discharge, and close the drums can not be carried out effectively while the carrier is vibrating. This, then means that every time one of the containers is to be filled or emptied, or when the contents of one of the drums is to be inspected, the treatment going on in both containers is interrupted. Consequently, much valuable time is wasted, so that the overall efficiency of the apparatus is materially reduced.

It is therefore an object of the present invention to provide a treating apparatus which overcomes the above disadvantages.

It is another object of the present invention to provide a treating apparatus in which work pieces of different sizes and shapes can be treated simultaneously.

It is a still further object of the present invention to provide a treating apparatus in which a plurality of treating containers are vibrated by a common carrier, but which apparatus is so constructed as to make it possible to fill, empty or inspect the contents of any one container while the carrier is vibrating, thereby rendering it unnecessary to stop the vibration of all containers.

The objects of the present invention also include the provision of a treating apparatus which is of compact construction, which is solidly built, and which will give long periods of trouble-free service.

With the above objects in view, the present invention mainly resides in an apparatus for treating the surface of work pieces, which apparatus comprises a vibratably mounted carrier, vibrating means for vibrating the carrier, a plurality of vats carried by the carrier, each of which vats is open at the top and has an end wall in the form of a slidably arranged closure member which is displaceable in vertical direction for opening and closing each respective vat, and a discharge gutter which is also carried by the carrier and which is arranged below the end walls of the vats so that the contents of the vats may pass into the discharge gutter. As a result, each of the vats may be filled, emptied, or have its contents inspected while the vibrating means vibrate the carrier, thereby rendering unnecessary the interruption of the surface treatment of work pieces in all of the vats for the purpose of allowing filling, emptying or inspection of the contents of any one of the plurality of vats.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which FIG. 1 is a side elevational view of a treating apparatus according to the present invention;

Figure 1:
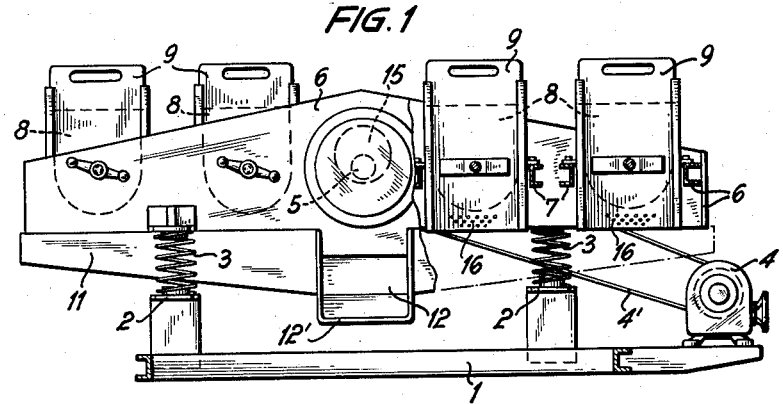
Figure 2:
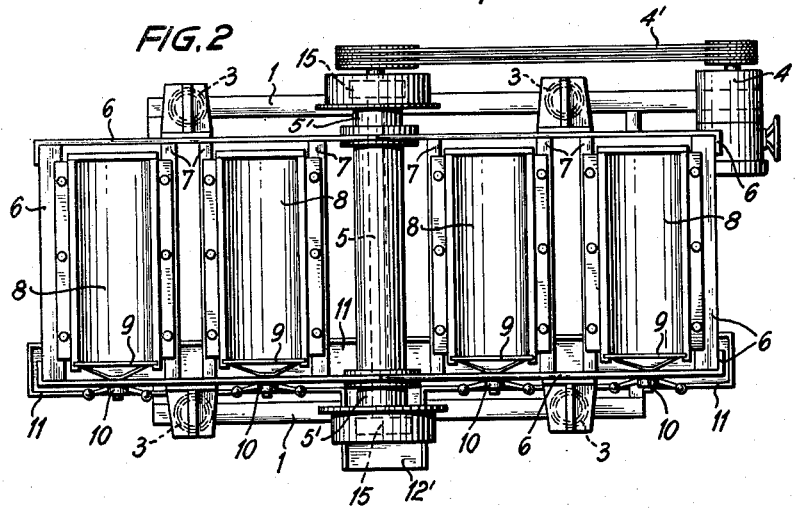
FIG. 2 is a plan view of the apparatus shown in FIG. 1.
Figure 3:
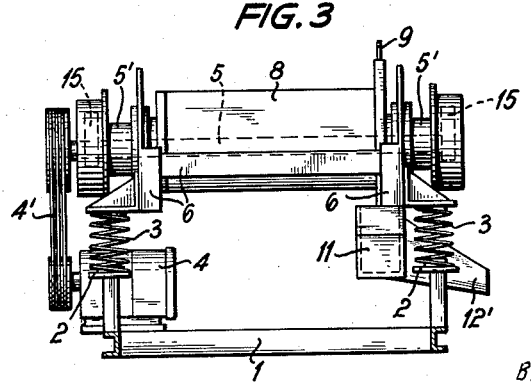
FIG. 3 is an end elevational view of the apparatus shown in FIGS. 1 and 2.

Referring now to the drawings, there is shown a treating apparatus comprising a base support 1 formed with pedestals 2 for coil springs 3 and with a support surface for a driving motor 4. The latter is power-transmittingly connected by means of wedge-shaped driving belts 4' to an unbalance shaft 5 rotatably supported in bearings 5' of an elongated rectangular carrier frame 6 which is supported on the springs 3 so that the frame 6 is vibratably mounted on the support 1. The unbalance shaft 5 which has eccentrically arranged unbalance weights 15 extends transversely to the longitudinal axis of the frame 6.

The frame 6 is formed with cross-member 7 on which a plurality of elongated vats 8 are supported. These vats 8 are arranged symmetrically with respect to the unbalance shaft 5.

As is shown in the drawing, the vats 8 are trough-shaped and are open at the top. One end wall of each vat is in the form of a slidably arranged closure member 9 which is displaceable in vertical direction for opening and closing the vat. Each vat 8 has associated with it a holding means in the form of a capstan-head screw arrangement 10 for wedging each respective closure member 9 in place.

Each closure member 9, when in its lowermost position, has a portion which extends below the bottom of its respective vat. This portion is apertured at 16, so that when the closure member 9 is raised to a position wherein this apertured portion is above the bottom of the vat, liquid contained in the vat may flow out.

The apparatus further comprises a discharge gutter 11 which is also mounted on the frame 6 and which is arranged below the ends of the vats which are closed off by the closure members 9. This gutter 11 runs along that longitudinal edge of the frame near which the above-mentioned ends of the vats are located, so that the contents of the vats may readily pass into the gutter 11. The latter is gradually tapered from each end toward a central outlet 12 where it communicates with a spout 12'.

The vibrating means constituted by the motor 4 and the unbalance shaft 5 are preferably so selected that the frame 6, and with it the vats 8 and the discharge gutter 11, will be vibrated along a closed curved path in a plane which is approximately at right angles to the axis of the unbalance shaft 5, at a frequency of between 10 to 50 cycles per second and at an amplitude of between 0.1 to 10 mm.

The work pieces to be treated as well as the appropriate treating agent and, if necessary, an additional treating liquid, can be introduced into the vats through their open tops. This can easily be accomplished even while the vats 8 are being vibrated, and it will be seen that the various vats can be charged with similar or dissimilar work pieces, treating agents and liquids. After the work pieces in one of the vats have been treated for the requisite time, the capstan-head screw 10 can be turned so as to free the closure member 9 for lifting. At first, the closure member is raised to a drainage position in which its apertured portion 16 is above the bottom of the vat. The screw 10 is then turned so as to hold the closure member 9 in place, and the liquid in the vat may then flow out through the apertures into the discharge gutter 11 and from there, past the outlet 12 and spout 12', into a suitably positioned liquid collector tank (not shown). The work pieces can then be rinsed, and after the closure member has again been lowered to a position wherein its apertured portion is below the bottom of the vat, fresh treating agent may be introduced into the vat, which fresh treating agent may be the same as that used previously or may be a different one. If no rinsing or after-treatment is desired, the closure member 9 is raised completely so that the work pieces as well as any solid treating agent in the vat can pass into the gutter 11 and from there to a collector receptacle (not shown) which has previously been replaced for the collector tank for the treating liquid.

The tightening and loosening of the capstan-head screw 10 as well as the raising and lowering of the closure member 9 may easily be effected even while the frame 6 is being vibrated. It is therefore possible to empty, fill of inspect the contents of each vat without requiring stoppage of the apparatus. This is very desirable during various types of operation to which work pieces may be subjected especially when the work pieces are being coated, for in that case the coating process may be closely observed at all times in all vats, and if necessary, coating material may be added to any vat or vats at the proper moment.

It will be noted that thanks to the fact that the discharge gutter 11 is carried by the frame 6 and is thus caused to vibrate under the influence of the unbalance shaft 5, the gradual taper toward the outlet 12 is all that is needed to make sure that the work pieces will actually move from the point at which they fall into the gutter 11 to the outlet 12 thereof. Thus, no special conveyor or other transport means are required.

Also, it will be noted, that all parts can be made of relatively small height, thereby reducing the mass of the parts which are put in vibration; this, in turn, reduces the power requirements for driving the apparatus. Also, the efficiency of the apparatus is increased by arranging the axis of the unbalance shaft parallel to the elongated vats which themselves are arranged symmetrically with respect to the unbalance shaft. Moreover, the apparatus may readily be adapted to use with any number of vats; if more vats are to be accommodated, the frame 6 is made longer, if less vats are needed, the frame is made shorter.

It will be understood that each of the elements described above, or two or more together, may also find a useful application in other types of treating apparatus differing from the types described above.

While I have illustrated and described the invention as embodied in a vibratory apparatus for treating work pieces: I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. An apparatus for treating the surface of work pieces, comprising, in combination: a vibratably mounted carrier; vibrating means for vibrating said carrier; a plurality of vats carried by said carrier, each of said vats being open at the top and having an end wall in the form of a slidably arranged closure member which is displaceable in vertical direction for opening and closing each respective vat; and a discharge gutter also carried by said carrier and being arranged below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

2. An apparatus for treating the surface of work pieces, comprising in combination: a vibratably mounted carrier; vibrating means for vibrating said carrier; a plurality of vats carried by said carrier, each of said vats being open at the top and having an end wall in the form of a slidably arranged closure member which is displaceable in vertical direction for opening and closing each respective vat, each closure member when in its downwardly most position having a portion which extends below the bottom of its respective vat and each such portion being apertured so that when the closure member is raised to a position wherein said portion is above the bottom of the vat, liquid contained therein may flow out; and a discharge gutter also carried by said carrier and being arranged below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats, and whereby liquid may be drained from each vat while said vibrating means vibrate said carrier by raising the corresponding closure member to said position wherein its apertured portion is above the bottom of the vat.

3. An apparatus for treating the surface of work pieces, comprising, in combination: a vibratably mounted carrier; vibrating means for vibrating said carrier; a plurality of vats carried by said carrier, each of said vats being open at the top and having an end wall in the form of a slidably arranged closure member which is displaceable in vertical direction for opening and closing each respective vat; holding means associated with each vat for holding the respective closure member thereof in fixed position; and a discharge gutter also carried by said carrier and being arranged below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

4. An apparatus for treating the surface of work pieces, comprising, in combination: a vibratably mounted carrier; vibrating means for vibrating said carrier; a plurality of vats carried by said carrier, each of said vats being open at the top and having an end wall in the form of a slidably arranged closure member which is displaceable in vertical direction for opening and closing each respective vat; holding means associated with each vat for holding the respective closure member thereof in fixed position, said holding means comprising a capstan-head screw arrangement for wedging each respective closure member in place; and a discharge gutter also carried by said carrier and being arranged below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

5. An apparatus for treating the surface of work pieces, comprising, in combination: a vibratably mounted carrier; vibrating means for vibrating said carrier; a plurality of vats carried by said carrier, each of said vats being in the form of an elongated trough open at the top and having an end wall in the form of a slidably arranged closure member which is displaceable in vertical direction for opening and closing each respective vat; and a discharge gutter also carried by said carrier and being arranged below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

6. An apparatus for treating the surface of work pieces, comprising, in combination: a support; a carrier vibratably mounted on said support; vibrating means for vibrating said carrier; a plurality of vats carried by said carrier, each of said vats being open at the top and having an end wall in the form of a slidably arranged closure member which is displaceable in vertical direction for opening and closing each respective vat; and a discharge gutter also carried by said carrier and being arranged below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

7. An apparatus for treating the surface of work pieces, comprising, in combination: a support; a carrier vibratably mounted on said support; vibrating means for vibrating said carrier, said vibrating means including an unbalance shaft mounted on said carrier and a driving motor for driving said unbalance shaft, said driving motor being mounted on said support; a plurality of vats carried by said carrier, each of said vats being open at the top and having an end wall in the form of a slidably arranged closure member which is displaceable in vertical direction for opening and closing each respective vat; and a discharge gutter also carried by said carrier and being arranged below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

8. An apparatus for treating the surface of work pieces, comprising, in combination: a vibratably mounted elongated carrier; vibrating means for vibrating said carrier; a plurality of elongated vats carried by said carrier, and having their longitudinal axes arranged transversely with respect to that of said carrier, each of said vats being open at the top and having an end wall in the form of a slidably arranged closure member which is displaceable in vertical direction for opening and closing each respective vat; and a discharge gutter also carried by said carrier and being arranged below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

9. The apparatus defined in claim 8 wherein said elongated carrier is in the form of a frame.

10. The apparatus defined in claim 9 wherein said end walls of said vats are near one of the longitudinal edges of said elongated carrier frame and wherein said discharge gutter extends along said one longitudinal edge of said carrier frame.

11. An apparatus for treating the surface of work pieces, comprising, in combination: a support; an elongated carrier frame vibratably mounted on said support; vibrating means for vibrating said carrier frame, said vibrating means comprising an unbalance shaft mounted on said carrier frame and extending transversely to the longitudinal axis thereof and a driving motor for driving said unbalance shaft, said driving motor being mounted on said support; a plurality of elongated vats carried by said carrier frame and having their longitudinal axes arranged transversely with respect to that of said carrier frame, each of said vats being open at the top and having an end wall in the form of a slidably arranged closure member which is displaceable in vertical direction for opening and closing each respective vat, each of said end walls being near one of the longitudinal edges of said carrier frame; and a discharge gutter also carried by said carrier frame and extending along said one longitudinal edge thereof below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

12. An apparatus for treating the surface of work pieces, comprising, in combination: a support; an elongated carrier frame vibratably mounted on said support; vibrating means for vibrating said carrier frame, said vibrating means comprising an unbalance shaft mounted on said carrier frame and extending transversely to the longitudinal axis thereof and a driving motor for driving said unbalance shaft, said driving motor being mounted on said support; a plurality of elongated vats carried by said carrier frame and being arranged symmetrically with respect to said unbalance shaft, said vats having their longitudinal axes arranged transversely with respect to that of said carrier frame, each of said vats being open at the top and having an end wall in the form of a slidably arranged closure member which is displaceable in vertical direction for opening and closing each respective vat, each of said end walls being near one of the longitudinal edges of said carrier frame; and a discharge gutter also carried by said carrier frame and extending along said one longitudinal edge thereof below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

13. An apparatus for treating the surface of work pieces, comprising, in combination: a support; an elongated carrier frame spring-mounted on said support; so as to be vibratable relative thereto; vibrating means for vibrating said carrier frame, said vibrating means comprising an unbalance shaft mounted on said carrier frame and extending transversely to the longitudinal axis thereof and a driving motor for driving said unbalance shaft, said driving motor being mounted on said support; a plurality of elongated vats carried by said carrier frame and having their longitudinal axes arranged transversely with respect to that of said carrier frame, each of said vats being open at the top and having an end wall in the form of a slidably arranged closure member whih is displaceable in vertical direction for opening and closing each respective vat, each of said end walls being near one of the longitudinal edges of said carrier frame; and a discharge gutter also carried by said carrier frame and extending along said one longitudinal edge thereof below said end walls of said vats so that the contents of said vats may pass into said discharge gutter, whereby each of said vats may be filled, emptied or have its contents inspected while said vibrating means vibrate said carrier, thereby rendering unnecessary the interruption of the surface treatment of work pieces in all of said vats for the purpose of allowing filling, emptying or inspection of the contents of any one of said plurality of vats.

14. An apparatus as defined in claim 13 wherein said vats are supported on cross-members of said carrier frame.

15. An apparatus for treating the surfaces of work pieces by contact with liquid and solid treating agents, said apparatus comprising, in combination, a vibratably mounted carrier; vibrating means for vibrating said carrier; a plurality of vats carried by said carrier each of said vats being open at its top so as to permit introduction of work pieces as well as of solid and liquid treating agents while said carrier is vibrated by said vibrating means, each having an at least partially open end, and each comprising means for selectively closing said end, for permitting only the discharge of liquid treating agent through said end, and for permitting the discharge of work pieces and of solid treating agent through said end whereby one or more vats may be evacuated while said carrier is vibrated by said vibrating means.

16. An apparatus for treating the surfaces of work pieces by contact with liquid and solid treating agents, said apparatus comprising, in combination, a vibratably mounted carrier; a plurality of substantially parallel elongated trough shaped vats carried by said carrier, each of said vats being open at its top so as to permit introduction of work pieces as well as of solid and liquid treating agents while said carrier vibrates, each having an at least partially open end, and each comprising means for selectively closing said end, for permitting only the discharge of liquid treating agent through said end, and for permitting the discharge of work pieces and of solid treating agent through said end whereby one or more vats may be evacuated while said carrier vibrates; and vibrating means for vibrating said carrier along a closed curved path in a plane which is substantially at right angles to the longitudinal directions of said vats.

References Cited in the file of this patent
UNITED STATES PATENTS

| | | |
|---|---|---|
| 582,873 | Nilsson et al. | May 18, 1897 |
| 2,144,046 | Cundall | Jan. 17, 1939 |
| 2,423,019 | Haines | June 24, 1947 |